Figure 1:
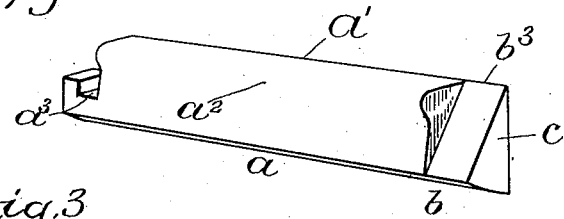

J. HARTNESS.
CUTTER FOR METAL TURNING TOOLS.
APPLICATION FILED OCT. 5, 1908.

1,063,680.

Patented June 3, 1913.

Witnesses:
F. R. Ronketone
P. W. Pezzetti

Inventor.
James Hartness
by Brown Dunlap May
his atty

UNITED STATES PATENT OFFICE.

JAMES HARTNESS, OF SPRINGFIELD, VERMONT.

CUTTER FOR METAL-TURNING TOOLS.

1,063,680.  Specification of Letters Patent.  Patented June 3, 1913.

Application filed October 5, 1908. Serial No. 456,166.

*To all whom it may concern:*

Be it known that I, JAMES HARTNESS, of Springfield, in the county of Windsor and State of Vermont, have invented certain new and useful Improvements in Cutters for Metal-Turning Tools, of which the following is a specification.

This invention has relation to cutters for use in metal turning tools, such for instance as engine lathes.

In turning metal the cutter is usually so formed and held that the angles of the various faces of the cutting nose thereof remain fixed in relation to the work. For instance, a cutting tool according to the general practice, is so placed and secured upon its holder that the face of the tool under the cutting edge stands at a slight angle to the wall of the metal from which the chip is being taken to provide a clearance so that only the extreme edge of the inner or clearance face, so called, is in contact with the metal. This universal practice of giving a lathe tool a clearance subjects the cutting edge to one-sided pressure and therefore necessitates the employment of very blunt edge tools capable of withstanding such pressure. Upon reflection, however, it will be obvious that the cutting edge should never be subjected to lateral stress although such an edge will stand enormous strain if the pressure is exerted against both faces thereof. Hardened steel may be subjected to an enormous compression strain, but a thin edge of hardened steel has little lateral strength. Since universal practice demands that the cutting tool be given a clearance, it is of course necessary to sacrifice what would otherwise be a very desirable feature, a wedge-shape cutting edge measuring say from 30° to 45°. In actual practice it is customary to employ a tool having a clearance angle of about 10° and a top slope of about 15°, leaving the lip angle of the tool 65°, so that the cutting angle, measured from the face of the work to the top slope, is approximately 75°; that is, the face of the tool which should plow off the chip of metal instead of standing at a desirable angle of say 30° to 45°, stands at an angle of 75°. The action of blunt tools makes the process of turning a scraping action in which the metal is crushed and crowded off from the face of the work.

The present invention comprises a cutter bar having inner and outer faces at a wedging angle and a convex bottom, so related that the cutter bar may oscillate to an extent sufficient to permit the pressure of the chip against the outer face of the cutter to force the inner face of the cutter against the face of the work, in consequence of which the pressure upon the two cutter faces is equalized and the chip is wedged off instead of being scraped or crowded off as heretofore.

The invention likewise consists in such a cutter bar having a cutting nose in which the cutting edge is formed by two faces at an acute or wedging angle and is downwardly inclined. The line at the intersection of the faces may however be straight and parallel to the median line of the bar or inclined thereto as hereinafter pointed out. The inner face may be curved to produce what is known as a round nose tool.

Figure 2:
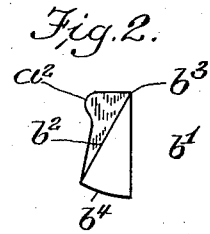
Figure 3:
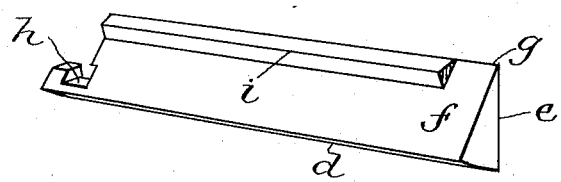
Figure 4:
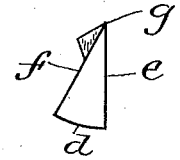
Figure 11:
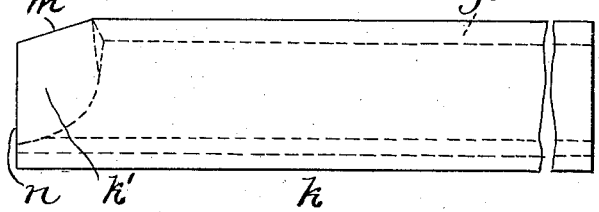
Figure 10:
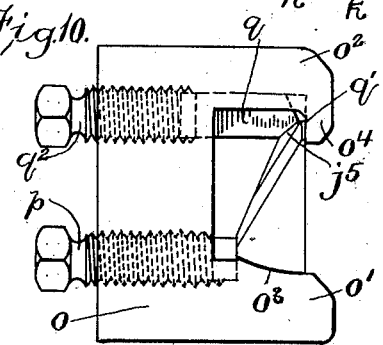

On the accompanying drawings,—Figure 1 represents in perspective view a cutter embodying the invention. Fig. 2 represents an end elevation of the cutter. Figs. 3 and 4 are similar views illustrating another form of cutter. Figs. 5, 6, 7, 8 and 9 represent respectively, a perspective view, an end elevation, a side elevation, a plan view, and a section on the line 9—9 of Fig. 7 of another form of cutter embodying the invention. Fig. 10 represents an end elevation of a tool with the cutter mounted therein. Fig. 11 represents a front elevation of the cutter.

Referring to the drawings and particularly to Figs. 1 and 2, it will be seen that the cutter is formed of an elongated bar comprising a shank $a$ and a cutting nose $b$. The cutting nose is formed with two faces $b'$ and $b^2$ at an acute angle to each other of approximately 30°, to form a cutting edge $b^3$. This cutting edge is substantially in alinement with the corner $a'$ of the shank. The cutting nose in section is substantially triangular, whereas the shank is substantially rectangular except that the bottom or under side of the shank and the cutting nose is cylindrically convex as indicated at $b^4$, so that it is substantially concentric with the cutting edge $b^3$ and the corner $a'$ of the shank.

In operation, the inner or clearance face $b'$ of the cutting nose is placed flat against the face of the work after the cutting edge has been caused to bite into the work and has cut an initial chip therefrom. The outer face or top slope $b^2$ receives the pressure of the chip, the pressure upon the two faces being equalized as pointed out in the specifications hereinbefore referred to. The provision of the convex or curved bottom or under side of the cutter makes it possible to seat the cutter in such manner that it may oscillate to a limited extent to permit the inner face $b'$ to follow the face of the work.

Along the shank near the top thereof, is a curved rib $a^2$ which may be engaged by adjustment screws arranged in the holder. At its rear end the shank is provided with a transverse notch $a^3$ which may be engaged by a screw or other device for resisting the end thrust of the cutter and for adjusting the same longitudinally. In this construction, the end clearance face $c$ of the cutting nose is at an angle of substantially 90° to the clearance face $b'$ and the top slope $b^2$. This cutter may be used in connection with the tool illustrated in Figs. 1 to 4 of the drawing and described in the specification of my application Serial No. 406,588, filed December 16, 1907.

Referring now to Figs. 3 and 4, it will be observed that the cutter there shown comprises a bar which is substantially triangular throughout its length, except that it has a cylindrically convex bottom or under side $d$. The faces $e$ and $f$ of the cutting nose and the shank are continuous throughout the length of the cutter and they are at an angle of substantially 30° so that at the cutting nose there is formed a cutting edge $g$. The rear end of the shank is notched as at $h$ for an abutment screw which is used to resist the end thrust of the cutter and to adjust it longitudinally. Along the shank of the tool is a rib $i$ with which the lateral abutment screws in the holder may be engaged as illustrated in Figs. 1 to 4 of the last-mentioned application.

Figure 5:
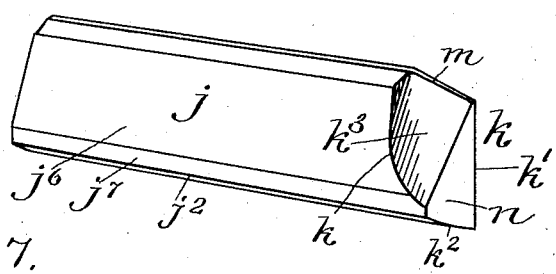
Figures 6, 9:
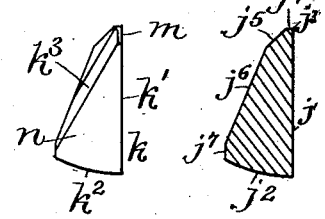

In Figs. 5 to 9 inclusive, I have illustrated still another form of cutter embodying the invention. In this case, the cutter is formed of an elongated bar comprising a shank $j$ with a cutting nose $k$. The shank of the cutter has a flat inner face $j'$ which is in substantially the plane of the inner or clearance face $k'$ of the nose. The cylindrical convex bottom or under side $j^2$ of the shank is extended to form the similar under side $k^2$ of the nose. As shown in section in Fig. 9, the curvature of the arc is that of a circle circumscribed about the corner $j^3$ formed by the face $j'$ and the narrow top face $j^4$. The outer side of the shank is formed by the three faces $j^5$, $j^6$ and $j^7$. The face $j^7$ is substantially parallel with the face $j'$ and it is formed so that it may be engaged by lateral abutment screws as will be explained. The face $j^2$ is formed so that it also may be engaged by a member in the holder for seating the cutter and holding it against undue movement. The cutting nose is substantially triangular. In addition to the inner or clearance face $k'$, it is formed with a top slope or outer face $k^3$. The faces $k'$ and $k^3$ lie in intersecting planes so as to form a cutting edge $m$ which starting at the top face $j^4$ of the shank, inclines outwardly and downwardly therefrom as clearly shown. The face $k^3$ is formed by grinding away the outer faces of the shank, and consequently said face is bounded by an obtuse curved corner $k^4$. The two faces $k'$ and $k^3$ are at an angle of substantially 30°, although this angularity may be varied to some extent. The cutting edge may be sharp or as shown it may be blunt as indicated at $m$ in Fig. 5, provided the top slope and clearance face are at an acute angle. In case it is blunt, its surface would preferably lie at substantially a right angle to the top slope $k^3$. The end clearance face $n$ of the nose may be plane or curved. As shown it is slightly convex and is at an angle slightly less than a right angle to the clearance face $k'$.

In the cutter thus described, the outer side of the cutter is provided with three faces at obtuse angles to each other, the faces adjacent the top and bottom of the bar or shank being adapted for the engagement therewith of screws, pins or devices for preventing the dislocation of the cutter.

Figure 7:
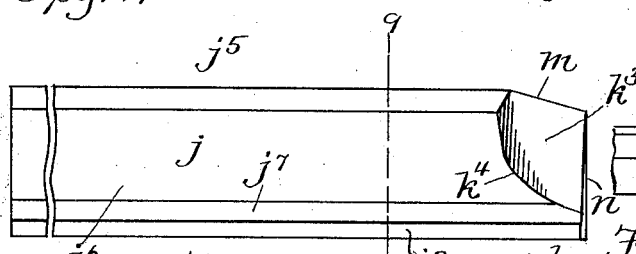
Figure 8:
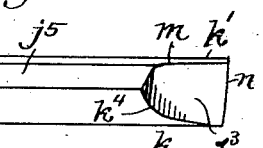

It will be noted from Figs. 7 and 11 that the inner face adjacent the end of the tool terminates in a line perpendicular to the top and bottom of the tool, and that the face on the end of the tool is at a slight obtuse angle to the inner face of the tool. This provides a slight clearance below the termination of the cutting edge which I find to be desirable, particularly in taking heavy cuts.

In Fig. 10, I have illustrated a typical holder for using the cutters embodying the invention. I do not claim herein the holder nor the means for mounting the tool therein, as the same are claimed in my previous applications hereinbefore referred to. In this last-mentioned figure, the holder consists of a substantially oblong block $o$ having forwardly projecting parallel flanges $o'$, $o^2$ forming a groove or recess for the reception of the cutter. The flange $o'$ has a concave seat $o^3$ to receive the convex bottom of the tool; and the flange $o^2$ has downwardly projecting lips $o^4$ against which the inner face $j'$ of the shank may rest. $p$ indicates lateral abutment screws the ends of which bear against the face $j^7$ of the shank so as to limit the oscillation of the cutter about the axis of the corner $j^3$. $q$ represents blocks or pins having beveled ends to engage the face $j^5$ on the outer side of the cutter. These pins or blocks are adjusted by screws $q^2$ which engage the ends thereof.

In all of the cutters which I have described, there is a convex under side or bottom, which renders possible a slight oscillation of the cutter, or its adjustment about a line approximating the cutting edge, and a cutting edge formed by two faces at a wedging angle. It will be apparent that there may be much variation in the precise form or conformation of the cutter without departing from the spirit and scope of the invention.

While I prefer that a cutting tool should have both the convex under side and the wedge-shape or acute-angle cutting nose, yet in some cases one or the other of these features may be omitted. For example, in a tool like that shown in Figs. 5 to 10 inclusive, the outer face or top slope of the cutting nose could be at an angle of, say, from 50° to 75° to the inner face, and while this would not to my mind be for all purposes so effective as the tool shown in said figures, it could under some circumstances be used where heat predominates in the destruction of the tool. It will be further understood that in lieu of tool having a flat inner face, I may employ one in which the inner face or nose is curved on a vertical axis so as to produce a round nose tool.

Having thus explained the nature of my said invention and described a way of constructing and using the same, although without attempting to set forth all of the forms in which it may be made or all of the modes of its use, I declare that what I claim is:—

1. A cutter for a metal-cutting tool, comprising a bar or shank having at one end a cutting edge longitudinal of said bar, said bar or shank having a longitudinal corner connecting with said edge and an under side concentric with said corner.

2. A cutter for a metal-cutting tool, comprising a bar or shank having a transversely convex under side, and at its end two acutely-converging faces terminating at the cutting edge, said faces and said curved under side forming substantially a sector of a circle.

3. A cutter for a metal-cutting tool, comprising a bar or shank having adjacent one end an inner side face and a top slope at a wedging angle, said shank having on one side in the rear of said top slope two faces at an obtuse angle to each other.

4. A cutter for a metal-cutting tool, comprising a bar or shank having adjacent one end an inner face and a top slope at a wedging angle and terminating in a cutting edge, the outer side of said bar being formed with three faces lying in obtusely intersecting planes.

5. A cutter for a metal-cutting tool consisting of a bar having at one end two faces at an angle, to form a cutting edge which is downwardly inclined with respect to the top of the bar, but longitudinal of said bar.

6. A cutter for a metal-cutting tool, comprising a bar having its top and bottom parallel, and having its side faces adjacent its end acutely converging, the inner side face terminating at the end in a line perpendicular to said top and bottom, the cutting edge formed at the intersection of said faces being obliquely and downwardly inclined with respect to said top of said bar.

In testimony whereof I have affixed my signature, in presence of two witnesses.

JAMES HARTNESS.

Witnesses:
 MARCUS B. MAY,
 P. W. PEZZETTI.